No. 681,157. Patented Aug. 20, 1901.
G. W. WALKER.
WARP MEASURING MACHINE.
(Application filed Oct. 4, 1900.)
(No Model.)
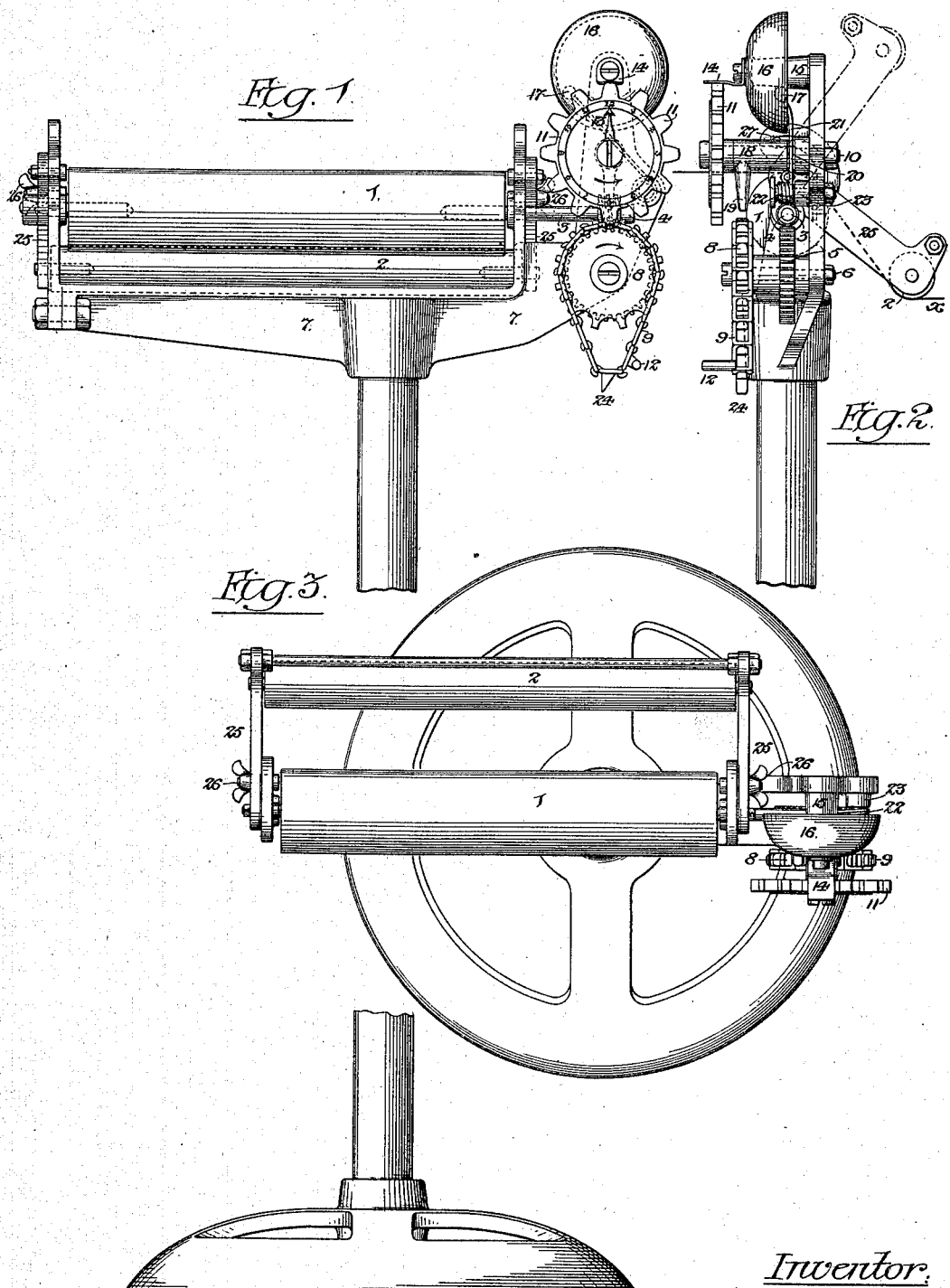
Witnesses:-
Inventor:
George W. Walker
by his Attorneys:
Howson & Howson

UNITED STATES PATENT OFFICE.

GEORGE W. WALKER, OF PHILADELPHIA, PENNSYLVANIA.

WARP-MEASURING MACHINE.

SPECIFICATION forming part of Letters Patent No. 681,157, dated August 20, 1901.

Application filed October 4, 1900. Serial No. 32,034. (No model.)

*To all whom it may concern:*

Be it known that I, GEORGE W. WALKER, a citizen of the United States, residing in Philadelphia, Pennsylvania, have invented certain Improvements in Warp-Measuring Machines, of which the following is a specification.

My invention consists of certain improvements in measuring devices particularly adapted for measuring warp during its passage from the yarn-spools to the warping-mill.

My invention is fully illustrated in the accompanying drawings, in which—

Figure 1 is a side elevation of my improved measuring device, with the standard for supporting the same partially broken away. Fig. 2 is an end elevation of said measuring device, and Fig. 3 is a plan view of the same.

The object of my invention is to determine accurately the amount of warp passed onto the warping-mill and to subdivide the same into "cuts" or sections more readily than heretofore. By "cut" I mean that portion of the warp for a predetermined length of cloth.

1 is the measuring-roll over which the warp $x$ passes, directed thereto by the guide or tension roller 2. In the machine which I have devised four times the circumference of the measuring-roll represents a yard, so that the warp in its passage across this roll may be definitely measured into the desired length with the yard as a unit. For the purpose of indicating the number of yards and to sound an alarm when a certain number of yards have been measured the following mechanism is employed:

On the end of the spindle 3 of the roller 1 a worm 4 is arranged, meshing with a worm-wheel 5, carried by a short shaft 6, mounted in the frame 7. Mounted on the end of the short shaft 6 is a chain-wheel 8, moving with the worm-wheel 5 and carrying a chain 9. Carried by a spindle 10 is a toothed wheel 11, said wheel being mounted above a chain-wheel 8 and having a dial on its face. This wheel is adapted to be engaged by a pin 12 of the chain 9, so as to be moved forward the distance of one tooth every time the pin 12 of the chain 9 comes in contact with said teeth. As I have arranged this mechanism every four revolutions of the worm moves the worm-wheel 5 and the chain-wheel 8 the distance of one link of the chain 9, representing one yard of warp, so that by arranging a link for every yard of the warp-cut to be measured said cut may be accurately measured in lengths of any size, the number of links of the chain corresponding to the number of yards in the cut. The chain illustrated in the drawings forming part of this application has fifteen links, and consequently every fifteen yards of the warp measured, representing a cut, will be registered by the dial and the gong sounded at the same time. A pointer 13 is fixed to the end of the spindle 10, and as the wheel 11 moves when engaged by the pin 12 of the chain 9 a new figure on the dial will be brought opposite said pointer. To prevent the toothed dial moving more than the distance of one tooth, a spring catch or pawl 14, having a suitable depression, is carried by the frame and adapted to engage a tooth of this wheel as the latter is moved by the pin on the chain, so that there is no danger of the chain-wheel moving more than a single tooth and no danger of its accidental movement.

The chain 9 which I employ is made up of detachable links, and I can put in or remove as many links as desired, so as to increase or decrease the number of yards to be measured for each cut or section of warp.

As soon as a certain length of warp has been measured off, such length being determined by the number of links in the chain, and before it is indicated by the dial, I desire to announce such fact by the ringing of a gong.

Carried by a suitable stud 15, secured to an arm projecting upwardly at one side of the frame, is a gong 16, and I arrange a hammer 17, adapted to strike this gong at proper intervals by suitable mechanism, which operates as follows: On the spindle 10 of the toothed dial-wheel 11 is a loose sleeve 18, having a depending arm 19 and having at the rear a flattened portion 20, arranged at an angle to the perpendicular. The supporting wire or stem 21 of the hammer 17 terminates in a coiled spring 22, which is secured to a pin 23, mounted on the frame, and said spring tends to hold said hammer in the position shown in Fig. 1, with the stem of the same lying across the angular face of the flattened portion 20 of the sleeve 18. One of the links of the chain 9 has a projection 24, which is immediately in advance of the link having the pin 12. The movement of the worm-wheel 5 carries the chain-wheel 8 and chain 9 around until the projection 24 of the latter is in position to engage the depending arm 19 of the sleeve 18 and hold the hammer 17 out of engagement with the gong 16 until the chain-wheel is moved to the extent of another link, when the projection 24 will be moved forward and release the depending arm 19 and permit the hammer 17 to assume its normal position, the gong 16 being sounded by this action. This movement of the chain 9 is continued indefinitely as the warp is run onto the warping-mill, and the operator is always aware of the amount of warp run onto said mill.

If at any time, either from the breaking of the threads, necessitating the tying in of the latter, or from any other cause, it may be necessary to pull the warp back through the measuring device, the mechanism will act in the reverse direction and indicate the amount of warp pulled back. For this purpose the depending arm 19 of the sleeve 18 is permitted to swing in both directions, so that it may be acted upon by the projection 24, and when the warp begins to run on the mill again there will be no mistake made in the length run on, due to the retraction of any portion of the warp.

Although not entirely necessary, I prefer to use the tension-roller 2 when running the warp onto the measuring-roll 1, as said roller 2 will tend to give the warp more surface on said measuring-roll; but it is desirable that this tension-roller be moved out of the way when the warp is retracted to tie any broken threads, and for this purpose the roller 2 is carried by arms 25, pivoted to the frame 7. Set-screws 26 are carried by said arms, the bolt portion of which screws is adapted to semicircular slots 27 in the frame 7, whereby said arms may be securely held when the tension-roller is moved to a position such as shown, for instance, in dotted lines in Fig. 2.

Although I have described my invention as applied to the measuring of warp, and particularly for the purpose of dividing such warp into cuts in its passage from yarn-spools to the warping-mill, I desire it to be understood that my invention covers also the measuring of cloth, cord, or any other material adapted to pass over a draft-roller which serves to operate the measuring mechanism.

Having thus described my invention, I claim and desire to secure by Letters Patent—

1. The combination of the draft or measuring roll, a frame for supporting said roll, a worm-wheel, a worm carried by the measuring-roll and adapted to mesh with said worm-wheel, mechanism comprising a rotatable dial-wheel and fixed pointer for indicating the amount of warp delivered by the measuring-roll, a chain-wheel mounted on the spindle of the worm-wheel, and a movable chain carried by said chain-wheel and having means for operating the dial-wheel, the movement of said chain being controlled by the worm-wheel, substantially as described.

2. The combination in a measuring device of the character described, comprising the measuring and tension rolls, a frame in which said rolls are supported, a worm and a worm-wheel controlled by the movement of the measuring-roll, a dial or indicator wheel, a chain-wheel mounted on the spindle of the worm-wheel and operated thereby, and a chain carried by said chain-wheel adapted to move the dial-wheel at certain intervals, substantially as described.

3. The combination in a measuring device of the character described, of the measuring-roll, a worm-wheel, a worm carried by said measuring-roll for operating the worm-wheel, a chain-wheel mounted on the spindle of the worm-wheel, a chain carried thereby, a dial or indicator wheel, and a projection carried by the chain and adapted to move said dial-wheel at regular intervals.

4. The combination in a measuring device of the character described, of the measuring-roll, a worm-wheel, a worm carried by said roll and meshing with the worm-wheel, a gong, a spring-controlled hammer for said gong, a loose sleeve having a portion cut away to permit the hammer to lie against the gong, an arm carried by said loose sleeve, and a chain-wheel and chain carried thereby, said chain having a projection adapted to engage the arm of the loose sleeve whereby the hammer may be raised from its position against the gong, said hammer when released striking the gong by the action of its spring, substantially as described.

5. The combination in a measuring device of the character described, of the measuring or draft roll, a worm and a worm-wheel operated thereby, a dial or indicator wheel, a chain-wheel carried by the spindle of the worm-wheel, a chain carried thereby and serving to move the dial-wheel at regular intervals, and means for preventing the accidental movement of the dial-wheel, or movement of said wheel greater than one tooth at a time.

6. The combination in a measuring device of the character described, comprising the measuring and tension rolls, a frame in which said rolls are supported, a worm carried by the measuring-roll, a worm-wheel operated thereby, a dial or indicator wheel, a chain-wheel mounted on the spindle of the worm-wheel and operated thereby, a chain carried by said chain-wheel adapted to move the dial-wheel at certain intervals, a gong carried by the frame, a hammer for said gong and means operated by said chain for moving said hammer to strike the gong at certain intervals.

7. The combination in a measuring device of the character described, comprising the measuring and tension rolls, a frame in which said rolls are supported, a worm carried by the measuring-roll, a worm-wheel operated thereby, a dial or indicator wheel, a chain-wheel mounted on the spindle of the worm-wheel and operated thereby, a gong carried by the frame, a hammer carried by said gong, means controlling the movement of said hammer, and a chain carried by the chain-wheel, said chain having projections adapted to engage the dial-wheel and the hammer controlling means whereby these parts may be operated successively, substantially as described.

In testimony whereof I have signed my name to this specification in the presence of two subscribing witnesses.

GEORGE W. WALKER.

Witnesses:
 MURRAY C. BOYER,
 JOS. H. KLEIN.